(12) United States Patent
Kanno et al.

(10) Patent No.: US 7,353,095 B2
(45) Date of Patent: Apr. 1, 2008

(54) DIAGNOSTIC SYSTEM FOR WATERCRAFT

(75) Inventors: Isao Kanno, Shizuoka (JP); Hitoshi Motose, Shizuoka (JP)

(73) Assignee: Sanshin Kogyo Kabushiki Kaisha (JP)

( * ) Notice: Subject to any disclaimer, the term of this patent is extended or adjusted under 35 U.S.C. 154(b) by 314 days.

(21) Appl. No.: 10/255,042

(22) Filed: Sep. 25, 2002

(65) Prior Publication Data

US 2003/0060952 A1   Mar. 27, 2003

(30) Foreign Application Priority Data

Sep. 26, 2001   (JP) ............................. 2001-294963

(51) Int. Cl.
*B63H 21/21* (2006.01)
*G06F 7/00* (2006.01)
*G06F 19/00* (2006.01)

(52) U.S. Cl. ............................. 701/34; 701/29; 701/33

(58) Field of Classification Search ................. 701/29, 701/21, 114, 33, 34; 114/61.12; 440/1, 84, 440/2

See application file for complete search history.

(56) References Cited

U.S. PATENT DOCUMENTS

| | | |
|---|---|---|
| 4,497,057 A | 1/1985 | Kato et al. |
| 4,708,669 A | 11/1987 | Kanno et al. ................. 440/1 |
| 4,796,206 A | 1/1989 | Boscove et al. |
| 4,822,307 A | 4/1989 | Kanno ........................... 440/1 |
| 5,136,279 A | 8/1992 | Kanno ......................... 340/636 |
| 5,245,324 A | 9/1993 | Jonker et al. |
| 5,325,082 A | 6/1994 | Rodriguez |
| 5,352,138 A | 10/1994 | Kanno |
| 5,481,261 A | 1/1996 | Kanno ..................... 340/870.16 |
| 5,633,573 A | 5/1997 | Van Phuoc et al. ............. 320/5 |
| 5,687,694 A | 11/1997 | Kanno ........................ 123/479 |
| 5,852,789 A | 12/1998 | Trsar et al. |

(Continued)

OTHER PUBLICATIONS

Co-Pending U.S. Appl. No. 10/251,722, filed Sep. 20, 2002 in the name of Isao Kanno.

(Continued)

*Primary Examiner*—Michael J. Carone
*Assistant Examiner*—Christine M Behncke
(74) *Attorney, Agent, or Firm*—Knobbe Martens Olson & Bear LLP (57) ABSTRACT

A diagnostic system is provided for a watercraft that is propelled by an outboard drive. Sensors can detect conditions of components related to at least the operation of the outboard drive. The diagnostic system can leave inside and outside computers. The inside computer is placed in the watercraft, while the outside computer is placed out of the watercraft. The outside computer is installed with a program to provide the inside computer with an instruction signal to start a diagnosis on the components. The inside computer is installed with a program to provide sensors with a commencement signal to start checking the components, to require the sensors to provide a detection signal, to collect detection signals, and to provide the outside computer with a result of the checking based upon the detection signals. The program of the outside computer additionally controls a monitor of the outside computer to indicate the conditions of the components based upon the result of the checking. The inside computer can create a table listing checked components and provide the outside computer with the table. Alternatively, the outside computer can be eliminated and the inside computer can display the table.

14 Claims, 8 Drawing Sheets

U.S. PATENT DOCUMENTS

| | | | |
|---|---|---|---|
| 5,904,604 | A | 5/1999 | Suzuki et al. |
| 5,935,187 | A | 8/1999 | Trsar et al. |
| 6,015,317 | A | 1/2000 | Hoshiba et al. ............... 440/1 |
| 6,055,468 | A | 4/2000 | Kaman et al. |
| 6,141,608 | A | 10/2000 | Rother |
| 6,370,454 | B1* | 4/2002 | Moore ........................ 701/29 |
| 6,377,879 | B2 | 4/2002 | Kanno ........................ 701/29 |
| 6,487,983 | B1* | 12/2002 | Jonsson et al. ......... 114/144 R |
| 6,615,160 | B1* | 9/2003 | Quinnett et al. ............ 702/185 |
| 6,647,769 | B1* | 11/2003 | Fujino et al. ............. 73/119 A |
| 2001/0023155 | A1* | 9/2001 | Shidara et al. ................. 440/1 |
| 2001/0049579 | A1* | 12/2001 | Fujino et al. ............... 701/114 |
| 2002/0037675 | A1* | 3/2002 | Irish ............................ 440/38 |
| 2002/0077007 | A1* | 6/2002 | Dagenais et al. ............... 440/1 |
| 2002/0185046 | A1* | 12/2002 | Motsenbocker .......... 114/61.12 |
| 2003/0060094 | A1* | 3/2003 | Motsenbocker ................ 440/6 |
| 2004/0249986 | A1* | 12/2004 | Minowa et al. ................ 710/1 |

OTHER PUBLICATIONS

Co-Pending U.S. Appl. No. 10/247,919, filed Sep. 20, 2002 in the name of Takashi Okuyama et al.

NMEA 2000; Standard for Serial Data Networking of Marine Electronic Devices; Main Document; Version 1.000, Sep. 12, 2001; @NMEA 1999, 2000, 2001.

NMEA 2000; Standard for Serial Data Networking of Marine Electronic Devices; Appendix A; Version 1.000; Sep. 12, 2001; @NMEA 1999, 2000, 2001.

NMEA 2000; Standard for Serial Data Networking of Marine Electronic Devices; Appendix B; @NMEWA 1999, 2000, 2001.

NMEA 2000; Standard for Serial Data Networking of Marine Electronic Devices; Appendix C; Version 1.000, Sep. 12, 2001, @NMEA 1999, 2000, 2001.

NMEA 2000; Standard for Serial Data Networking of Marine Electronic Devices; Appendix D; Version 1.000, Sep. 12, 2001, @NMEA 1999, 2000, 2001.

NMEA 2000; Standard for Serial Data Networking of Marine Electronic Devices; Appendix E; ISO 11783-5 Network Management.

NMEA 2000; Standard for Serial Data Networking of Marine Electronic Devices; Appendix F; ISO 11783-3 DataLink Layer.

NMEA 2000; Standard for Serial Data Networking of Marine Electronic Devices; Appendix G; ISO 11898 Controller Area Network.

* cited by examiner

| # | Check Item (132) | Result of Check (134) | Normal Range (Reference) (136) | Warning (138) |
|---|---|---|---|---|
| 1 | Battery Votlage | ○○ v | xx ~ △△ v | |
| 2 | Battery Liquid Level | -○○- mm | 0 ~ -△△ mm | * |
| 3 | Fuel Level | ○○ l | xx ~ △△ l | |
| 4 | Lubricant Oil Level | ○○ l | xx ~ △△ l | |
| ... | ......... | ......... | ......... | ......... |

DIAGNOSTIC SYSTEM FOR WATERCRAFT

PRIORITY INFORMATION

This application is based on and claims priority to Japanese Patent Application No. 2001-294963, filed Sep. 26, 2001, the entire content of which is hereby expressly incorporated by reference.

BACKGROUND OF THE INVENTION

1. Field of the Invention

The present invention generally relates to a controllers for watercraft, and more particularly to a diagnostic system for a watercraft.

2. Description of Related Art

Watercraft such as a pleasure boats and fishing boats can employ an outboard drive such as an outboard motor. The outboard motor typically incorporates an internal combustion engine placed atop thereof and a propeller disposed in a submerged position when the associated watercraft rests on a surface of a body of water. The engine powers the propeller to propel the watercraft.

All watercraft need to be diagnosed periodically or prior to operation. Some watercraft can be moored at, for example, a pier of a marina that provides services for the periodic or regular diagnosis of the watercraft. Other watercraft, however, normally are kept on land. Owners of such watercraft therefore should conduct the diagnosis by themselves or ask someone else such as, for example, a mechanic.

Typically, watercraft stored on land are mounted on a boat trailer. Respective components of the watercraft and the propulsion system should be checked one by one. The owners or mechanics thus should climb in to the cockpit for certain inspections. Such diagnoses thus are neither efficient nor comfortable for the owners or mechanics.

SUMMARY OF THE INVENTION

A need therefore exists for an improved diagnostic system for a watercraft that is efficient or comfortable for a person who conducts a diagnosis of the watercraft.

In accordance with one aspect of the present invention, a diagnostic system for a watercraft propelled by a propulsion unit, in which either the watercraft or the propulsion unit having sensors configured to detect conditions of components related to at least the operation of the propulsion unit, comprises an output device, a first module configured to provide the sensors with a commencement signal to start checking the components, and a second module configured to query the sensors to transmit a detection signal. Additionally, a third module is configured to output the conditions of the components based upon the detection signals to the output device.

In accordance with another aspect of the present invention, a diagnostic system for a watercraft propelled by a propulsion unit and having a plurality of sensors configured to detect conditions of components related to at least the operation of the propulsion unit, wherein the diagnostic system comprises first and second processors and an output device. The first processor comprises a first module configured to provide the second processor with an instruction signal to start a diagnosis of the components. The second processor comprises a second module configured to provide the sensors with a commencement signal to start checking the components. A third module is configured to query the sensors for a detection signal. A fourth module is configured to collect the detection signals. Additionally, a fifth module is configured to provide the first processor with a result of the check based upon the detection signals. The first processor additionally comprises a sixth module configured to control the output device to output the conditions of the components based upon the result of the check.

In accordance with a further aspect of the present invention, a method for diagnosing a watercraft propelled by a propulsion unit comprises providing sensors with a commencement signal to start a diagnosis on components related to at least the operation of the propulsion unit. Additionally, the method includes requiring the sensors to provide a detection signal and controlling an output device to output the conditions of the components based upon the detection signals.

BRIEF DESCRIPTION OF THE DRAWINGS

These and other features, aspects and advantages of the present invention will now be described with reference to the drawings of several preferred embodiments, which are intended to illustrate and not to limit the invention. The drawings comprise eight figures.

DETAILED DESCRIPTION OF THE PREFERRED EMBODIMENTS OF THE INVENTION

With reference to FIGS. 1-5, one preferred diagnosis system 30 is described below.

Figure 1:
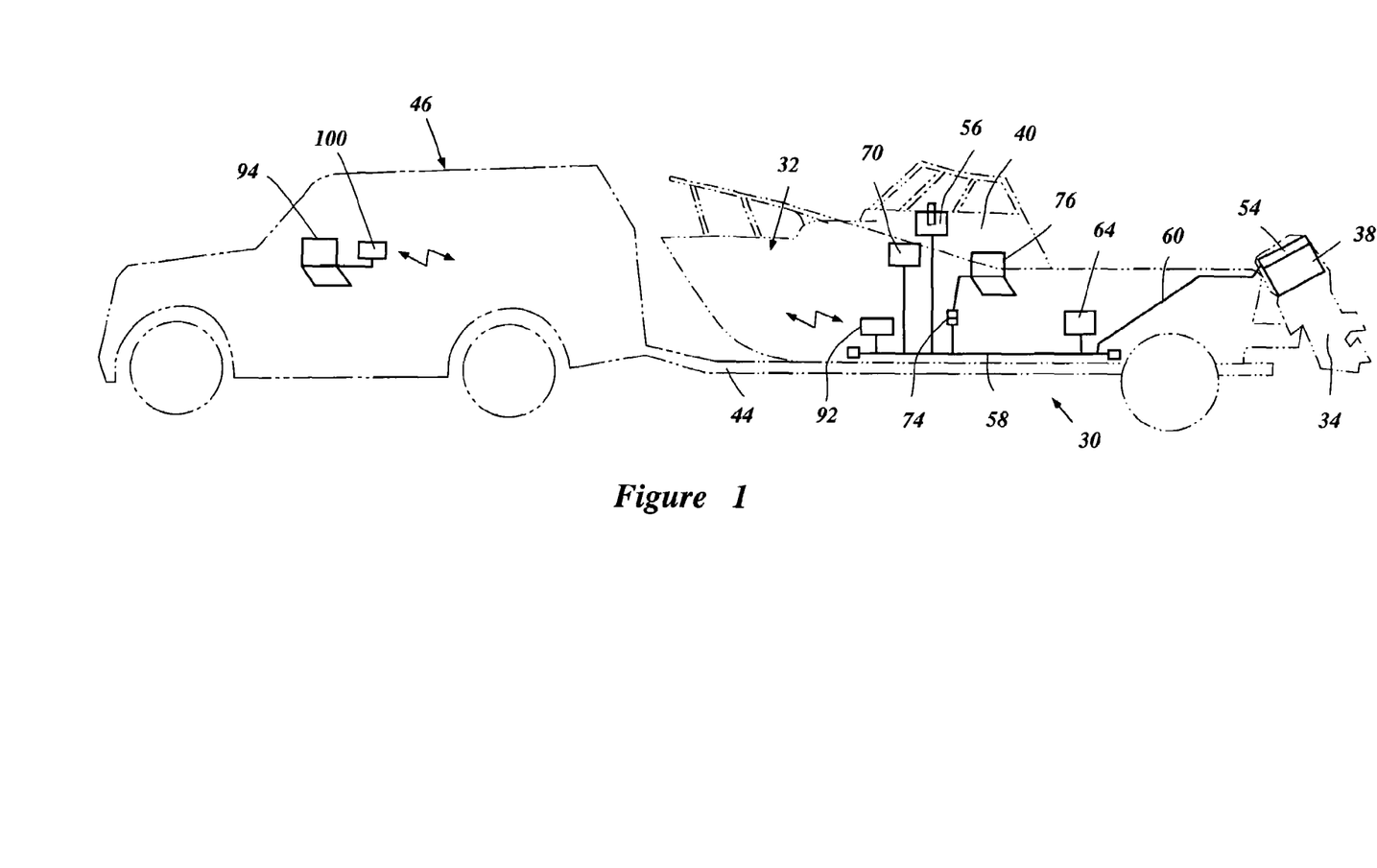
FIG. 1 is a schematic illustration of a diagnostic system configured in accordance with a certain features, aspects and advantages of the present invention. In the figure, the diagnostic system is associated with a watercraft that employs an outboard motor and is mounted on a boat trailer pulled by a vehicle. The watercraft, the outboard motor, the trailer and the vehicle are illustrated in phantom except for components related to the diagnostic system.

With reference first to FIG. 1, a watercraft 32, associated with the diagnostic system 30 in this embodiment, is a pleasure boat or a fishing boat. The watercraft 32 employs an outboard motor 34, as an exemplary outboard drive, mounted on a transom of the watercraft 32 to propel the watercraft 32. The outboard motor 34 incorporates an internal combustion engine 38 that is disposed atop of the outboard motor 34 and a propulsion device (not shown) such as, for example, a propeller that can be placed in a submerged position when the watercraft 32 rests on a surface of a body of water. The engine 38 and the propulsion device define a propulsion unit for the watercraft 32 for propelling the watercraft 32 across a surface of a body of water.

The watercraft 32 defines a cockpit 40 in which an operator remotely operates the outboard motor 34. The illustrated watercraft 32 is mounted on a boat trailer 44 pulled by a vehicle 46 such as, for example, a motorcar.

The illustrated diagnostic system 30 diagnoses components related to at least the operation of the outboard motor 34. However, components only related to the watercraft 32 or components not related to the operation of the outboard motor 34 can be diagnosed. For example, lighting appliances or fishing equipment can be diagnosed.

The diagnostic system 30 has a particular utility in the context of a combination of such a pleasure boat or a fishing boat propelled by the outboard motor 34 and is described in the context of the combination. The diagnostic system 30, however, can be used with other types of watercrafts and other types of outboard drive. For example, the diagnostic system 30 can be applied to watercrafts with inboard motors or inboard/outboard motors. In addition, the trailer 44 can be uncoupled from the vehicle 46. The watercraft 32 in turn can be supported in any other way, for example, but without limitation, in dry-dock. The diagnostic system 30 is quite useful when the watercraft 32 is kept on land. However, the diagnostic system 30 can also be used when the watercraft 32 is moored at a pier of a marina.

Figure 2:
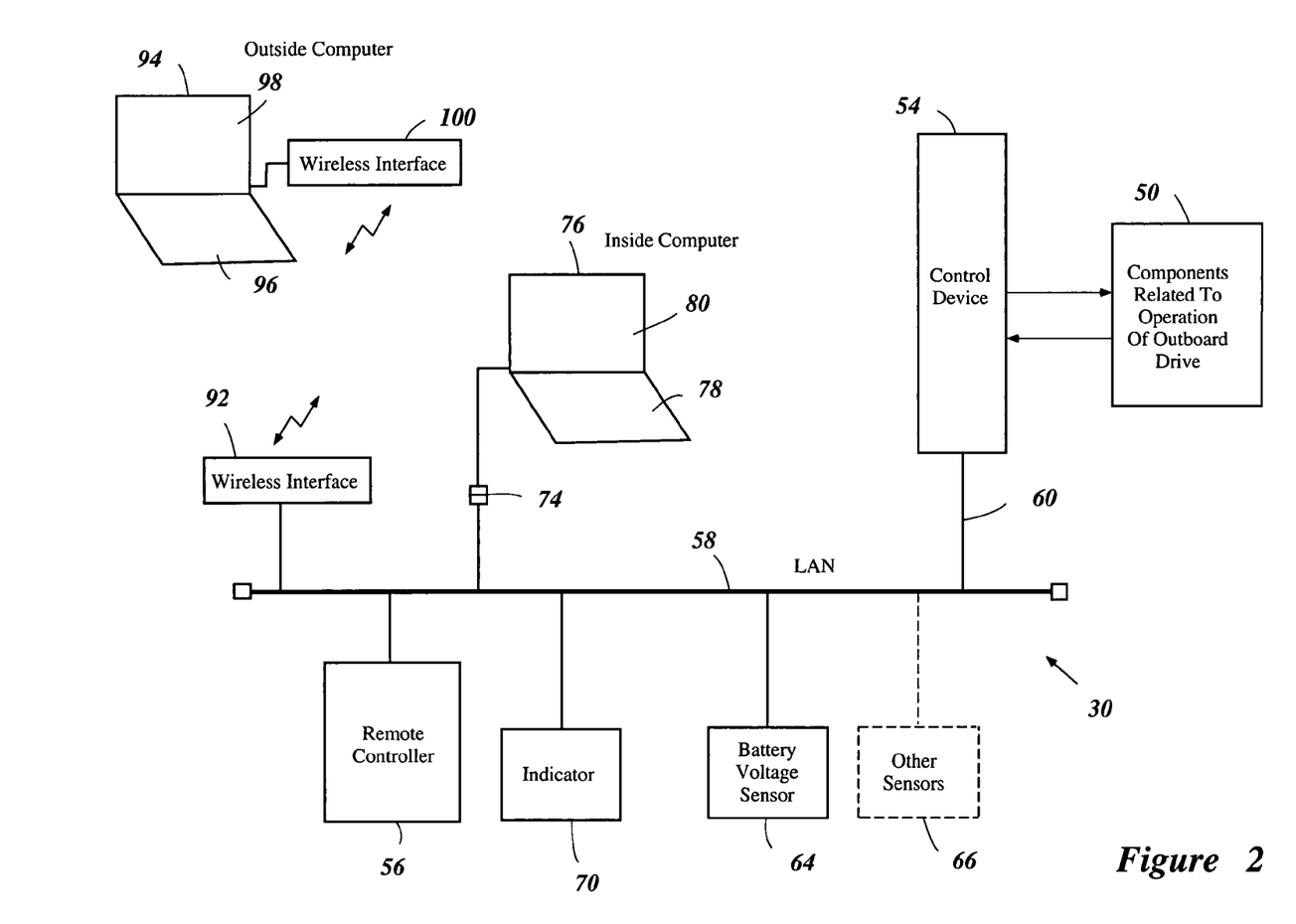
FIG. 2 is a block diagram of the diagnostic system of FIG. 1.

With reference to FIGS. 1 and 2, the engine 38 comprises an air induction system that delivers air to one or more combustion chambers of the engine 38. The engine 38 additionally comprises a charge forming system such as a fuel injection system or carburetor system associated with the air induction system to form air/fuel charges in the combustion chambers. When the air/fuel charges burn in the combustion chambers, power is generated. The outboard motor 34 uses the power to drive the propeller. An exhaust system also is provided to guide byproducts from the combustion chambers.

The air induction system incorporates a throttle device comprising one or more throttle valves (not shown) to regulate or meter an amount of the air at every induction cycle. Each throttle valve can be a butterfly type and can be coupled with an intake passage or a plenum chamber for pivotal movement. When the position of the throttle valve is changed, an opening degree of an airflow path of the intake passage or the plenum chamber changes and an amount of the air can be regulated. Thereby, the output of the engine 38 can be changed. Normally, the greater the opening degree, the higher the rate of airflow and higher the power output or "engine load." A slidably movable throttle valve of course can replace the butterfly type throttle valve.

The throttle device preferably is provided with a throttle actuator (not shown) such as, for example, an electric motor. The electric motor preferably is coupled with a throttle valve shaft or a shaft related to the throttle valve. The electric motor rotates in response to a control signal from the operator to actuate the throttle device.

The output of the engine 38 is transferred to the propeller through a transmission disposed in a lower housing of the outboard motor 34. The transmission has a transmission shift mechanism that can shift the state of the transmission between forward, neutral, and reverse. Throughout this description, the term "gear position" appearing below means the state of the transmission or the position of the shift mechanism that corresponds to the direction in which the propeller is driven.

The shift mechanism preferably is provided with a shift actuator (not shown) such as, for example, an electric motor or a solenoid coupled with a shift rod or other members. The motor or solenoid moves in response to a control signal from the operator to actuate the shift mechanism.

The throttle and shift actuators are one of components 50 (FIG. 2) that are related to the operation of the outboard drive 34. Other components such as, for example, a fuel injector(s) or a valve timing change mechanism can also be included in the outboard drive operation related components 50.

The outboard motor 34 incorporates a control device 54 that controls the outboard drive operation related components 50, i.e., the throttle actuator and the shift actuator in this embodiment. One skilled in the art will also appreciate that the control device 54 described herein can also be used with adjustment mechanisms other than throttle valves and shift mechanisms. For example, the control device 54 can be used with adjustment mechanisms that change operating stage to regulate fuel flow (e.g., vary fuel injection timing, duration, amount, fuel pressure, etc.), with adjustment mechanisms that change operating stages to regulate ignition timing, and with adjustment mechanisms that change operating stage to regulate cylinder valve movement (e.g., vary intake exhaust valve timing, duration, and/or lift).

The control device 54 preferably comprises a microprocessor or central processing unit (CPU), a memory or storage and an interface connecting the CPU and the memory to each other. The illustrated control device 54 is located next to the engine 38. Other locations also are available. For example, the control device 54 can be placed in a hull of the watercraft 32.

The watercraft 32 is provided with a remote controller or operating device 56 preferably disposed in the cockpit 40. Preferably, the operating device 56 is disposed in a remote location from the upward motor 34 so that the operator does not have to sit close to the outboard motor 34. A local area network (LAN) 58 and an electric cable 60 preferably connects the remote controller 56 with the control device 54. In preferred embodiments, the LAN 58 is furnished at the bottom portion of the hull along the keel line extending fore to aft. The remote controller 56 preferably has a pair of levers (not shown) pivotally or slidably mounted onto a body of the controller 56. One of the levers is a throttle lever and the other lever is a shift lever. The throttle and shift levers are positioned adjacent to each other such that the operator can operate both of the levers with one hand.

When the throttle lever is operated, the device 56 generates an initial throttle position control signal. When the shift lever is operated, the device 56 generates an initial shift position control signal. In other words, an amount of the physical movement of either the throttle lever or the shift lever, i.e., an angular position or a slide position from each original position, is converted to a lever position signal. The lever position signals have a voltage or other electrical value that corresponds to the amount of movement or the position of the lever. For example, the device can include analog sensors for detecting a position of the levers, and analog-to-digital converter for converting the output of the sensors to a digital signal, and a network interface device for formatting the digital signals for transmission over the LAN 80.

The control device 54 can send the initial control signals to the throttle actuator and the shift actuator without changing the signals. Alternatively, the illustrated control device 54 can be configured to modify the initial control signals in accordance with environmental conditions. For example, the CPU of the control device 54 communicates with the memory through the interface. The memory preferably includes a multi-dimensional control map containing control amounts corresponding to versus engine loads and throttle lever positions. The CPU selects one of the control amounts most suitable to the engine load and the throttle lever position under the circumstances, and controls the throttle actuator and shift actuator based on the control amounts.

Preferably, a throttle position sensor, a shift position sensor and an engine speed sensor are configured to detect, respectively, a position of the throttle valve, a position of the shift mechanism, and the speed of the engine. Additionally, the throttle position sensor, shift position sensor, and engine speed sensor configured to generate signals indicative of the position of the throttle valve, position of the shift mechanism, and the engine speed, respectively. These sensors are also configured to send a throttle position signal, a shift position signal (i.e., gear position signal) and an engine speed signal, respectively, to the CPU of the control device 54. Each signal has a voltage and/or other electrical values.

The throttle position sensor detects an actual position or opening degree of the throttle valves. The throttle position sensor preferably is disposed on a valve shaft or a shaft connected to the valve shaft.

The shift position sensor detects an actual position of the transmission shift mechanism. That is, the shift position sensor senses if the gear position is forward, neutral or reverse. The shift position sensor can be disposed, for example, adjacent to the shift rod.

The engine speed sensor preferably is formed with a crankshaft angle position sensor which is provided proximate a crankshaft of the engine 38. The angle position sensor, when measuring crankshaft angle versus time, outputs a crankshaft rotational speed signal or engine speed signal. Alternatively, the angle position sensor can transmit a stream of pulses corresponding to the movement of teeth mounted on a flywheel of the engine. The frequency such pulses can be used by the control device 54 to determine the speed of the engine.

The CPU of the control device 54 can recognize the engine load from the throttle position signal and the engine speed signal and can use the engine load in controlling the outboard motor 34 and particularly the engine 38.

A similar control system is disclosed in, for example, U.S. application No. 10/251,722 filed on Sep. 20, 2002, titled ENGINE CONTROL SYSTEM FOR WATERCRAFT, now U.S. Pat. No. 6,890,223 entire contents of which is hereby expressly incorporated by reference.

In the illustrated embodiment, a battery voltage sensor 64 is provided. The battery voltage sensor 64 is configured to detect changes in the voltage of the battery. Thus, the battery voltage sensor watches whether the battery voltage is kept constant or not. Other various sensors 66 can also be provided. The sensors 66 include sensors that detect conditions of the outboard drive operation related components 50 and sensors that detect conditions of components other than the components 50. For example, the other sensors include a lubricant oil amount sensor, a fuel amount sensor, a battery liquid amount sensor, a lubricant oil quality sensor that detects deterioration of the lubricant oil, a conduction sensor that detects electrical conductivity, and a usage time integrating sensor or meter that integrates usage time of respective components. Output signals of these sensors 64, 66 can be sent to the LAN 58 directly or through the control device 54 and/or the electric cable 60. Some of the output signals, particularly, the output signals indicative of the conditions of the outboard drive operation related components 50 are used for control of the outboard drive 34.

In this description, the term "other sensors" includes the throttle position sensor, the shift position sensor and the engine speed sensor. Also, the term "sensor(s)" in this description means not only the sensors in the narrow sense but also parts, components, devices and other equipment that can output a condition thereof by themselves. For example, the control device 54 in this embodiment also is one of the sensors in the broad sense. Furthermore, the sensors can include the throttle and shift actuators if these actuators send signals indicative of the condition thereof without the control device 54.

A digital or analog indicator (or meter) 70 also is disposed in the cockpit 40 and is connected to the LAN 58 to indicate the throttle position, the shift position, the engine speed, the battery voltage and/or other data. The operator can recognize how the outboard motor 34 operates by looking at the indicator 70. The output signals of the sensors 64, 66 also are sent to the indicator 70 through the LAN 58 to be used for indicating normal or abnormal conditions of the associated devices or unit. Otherwise, the signals can be sent to an alarm such as, for example, a buzzer to warn the user of abnormal conditions.

As thus described, the illustrated LAN 58 collects all data as to the conditions of the control device 54 and the remote controller 56, and also outputs of the battery voltage sensor 64 and other sensors 66. The data are available, accordingly, at any device connected to the LAN 58 such as the indicator 70.

In order to use the data on the LAN 58, a connector 74 is provided at the LAN 58 or extends from the LAN 58. A computer 76 preferably is connected to the LAN 58 through the connector 74. The illustrated computer 76 is an all-purpose computer such as, for example, a personal laptop type computer that has a keyboard 78 and a monitor 80. The computer 76 preferably is located in the cockpit 40. Therefore, the computer 76 is referred to as an "inside computer" below.

Figure 3:
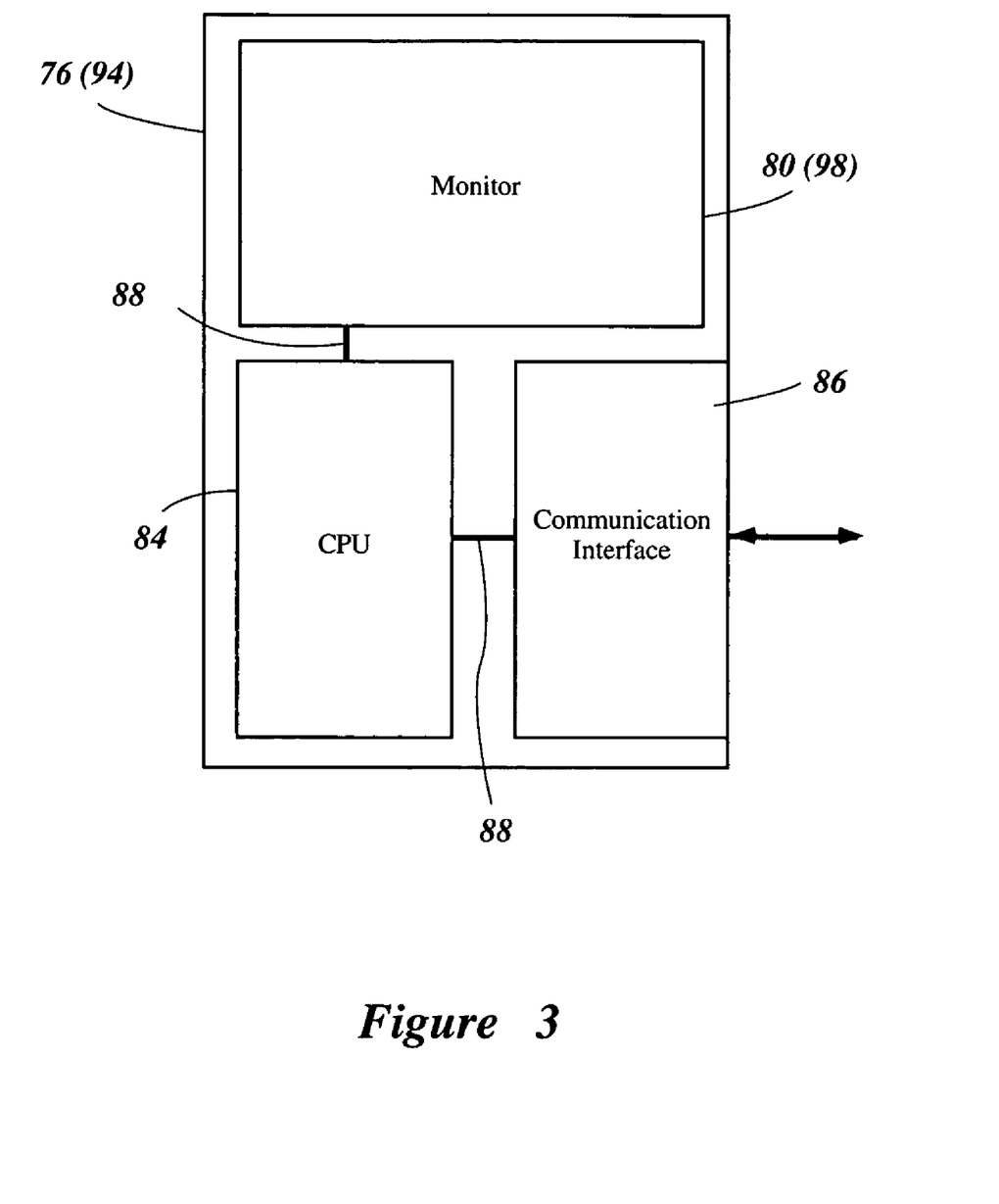
FIG. 3 is a schematic illustration of each computer that is used for the diagnostic system and is located either in the watercraft or out of the watercraft.

With reference to FIG. 3, the computer 76 preferably comprises a microprocessor or central processing unit (CPU) 84, a memory or storage (not shown), an input device such as the keyboard 78, an output device such as the monitor 80, a communication interface 86, and internal control and databases 88. In this description, the term "processor" or "processing section" means a combination of the CPU and the memory in the broad sense unless otherwise explained.

The communication interface 86 is connected to the LAN 58 through the connector 74 to exchange data with the LAN 58. The internal control and databases 88 connect the CPU, the memory, the input device (keyboard 78) and the output device (monitor 80) with each other. The CPU controls the other part of the computer 76 through the control bases. Data are exchanged internally through the data bases.

Either the input device or the output device or both the devices can be separately placed from a main body of the computer 76. For example, a distinct keyboard unit or other input device can be remotely provided. Also, a distinct monitor or other output device can be remotely provided. The output device can also include a printer.

With reference back to FIG. 2, a wireless interface 92 also is connected to the LAN 58 to provide another computer 94 with the data on the LAN 58 by radio, or other wireless transmission means. The wireless interface 92 can be selected from any known wireless interfaces. For example, the radio interface named "Bluetooth™" is used in the system 30. Like the inside computer 76, the illustrated computer 92 is an all-purpose computer such as, for example, a personal laptop type computer that has a keyboard 96 and a monitor 98. The computer 92 preferably has the same construction as the inside computer 76, which has been described with reference to FIG. 3. Thus, in FIG. 3, the CPU, the communication interface, and the internal control and databases of the computer 94 are indicated by the same reference numbers as those corresponding thereto. The computer 94 has a wireless interface 100 connected to the communication interface 86. The radio interface named "Bluetooth™" also can be used as the wireless interface 100.

In the illustrated embodiment, the computer 94 is placed in the vehicle 46 that pulls the trailer 44. However, the computer 94 is portable and can be located at any place within the range of the wireless interfaces 92, 100. For example, a person who conducts the diagnosis can bring the computer 94 to the trailer 44, to a garage where the trailer 44 is placed, to a house or office located next to or nearby the garage, and even to inside of the cockpit 40 of the watercraft 32.

Figure 8:
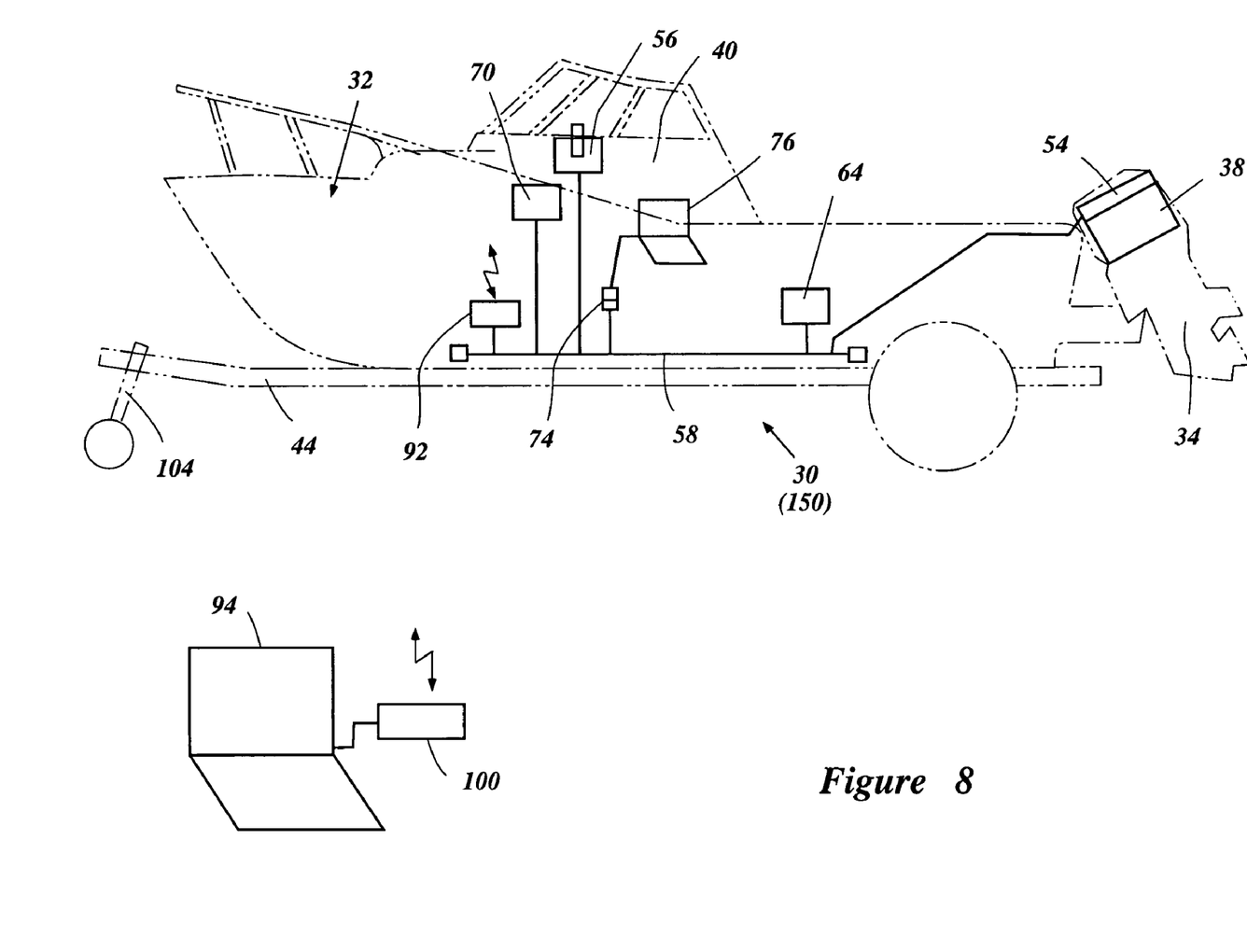
FIG. 8 is a schematic illustration of a watercraft including either of the diagnostic systems of FIGS. 1-7 which, in this figure, is uncoupled from a vehicle.

FIG. 8 illustrates one of such situations. The boat trailer 44 is uncoupled from the vehicle 46 and is placed in the trailer garage, on the seashore, or at another location. The trailer 44 in this situation is supported by a marine jack 104 so as to keep the watercraft 32 horizontal. The person performing the diagnosis can bring the computer 94 to any place within the range of the wireless interfaces 92, 100. Because the same reference numerals are assigned to the watercraft, the boat trailer, the outboard motor and the components shown in FIG. 8 as those shown in FIG. 1, no further description of those components is provided.

As thus described, the computer 94 generally is placed out of the watercraft 32. Therefore, the computer 94 is referred to as an "outside computer" below.

The illustrated diagnostic system 30 comprises the foregoing hardware or infrastructure including the LAN 58, the inside computer 76 and outside computer 94, and a software or program installed in the inside computer 76 and/or the outside computer 94. A similar diagnostic system using a similar infrastructure and another program is disclosed in U.S. application Ser. No. 10/247,919 filed Sep. 20, 2002 and titled DIAGNOSTIC SYSTEM FOR WATERCRAFT, now abandoned entire contents of which is hereby expressly incorporated by reference.

Figure 4:
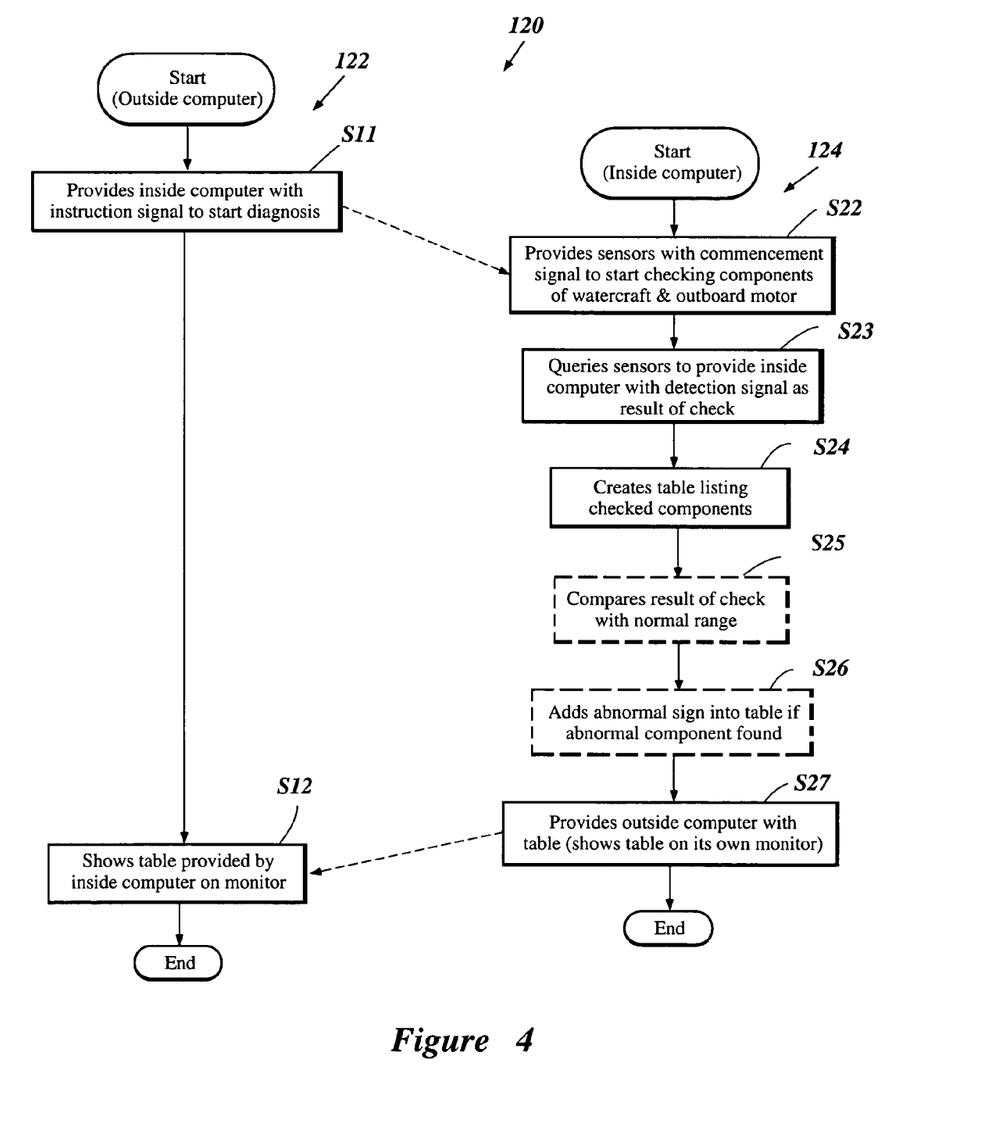
FIG. 4 is a flow chart of a control routine that can be used with the diagnostic system of FIG. 1.

With reference to FIG. 4, a diagnostic routine 120 of the installed program is described below.

The illustrated diagnostic routine 120 preferably comprises a first routine 122 installed in the outside computer 94 and a second routine 124 installed in the inside computer 76. The solid-line arrows indicate transfers from one step to another step in the same routine at either the inside or outside computer 76, 94. The phantom arrows indicate cues that start a step in the routine of the other computer. In this embodiment, the person performing the diagnosis, or the "user," is positioned at the outside computer 94 in the vehicle 46.

The first routine 122 starts and proceeds to the step S11. At the step S11, the outside computer 94 provides the inside computer 76 with an instruction signal to start a diagnosis on the components including at least one and preferably all of the outboard drive operation related components 50. For example, the user gives the instruction via the keyboard of the outside computer 94. The first routine 122 then advances to the step S12 and the outside computer 94 waits to receive a response signal from the inside computer 124.

The second routine 124 starts and proceeds to the step S22. The inside computer 76, at the step S22 and upon receiving the instruction signal from the outside computer 94, provides the sensors 64, 66 with a commencement signal to start checking the components. The second routine 124 then advances to the step S23.

At the step S23, the inside computer 76 requests the sensors 64, 66 to transmit to the inside computer 76 a detection signal, or in other words, "queries" the sensors 64, 66. For example, the inside computer 76 can request that the control device 54 sample the output of the related sensors. Next, the second routine 124 advances to the step S24.

The inside computer 76, at the step S24, creates a table listing the conditions of the components based upon the detection signals. The routine 124 moves to the step S25.

At the step S25, the inside computer 76 determines if at least one of the conditions is abnormal. The determination preferably is made by comparing the detection signals with predetermined normal values or preset ranges of the normal values which are previously stored in the memory of the inside computer 76. For example, if the detection signal is out of the range, then the subject component is abnormal. The normal values can be collected through several experiments or test cruising of the watercraft 32. The routine 124 then advances to the step S26.

At the step S26, the inside computer 76 adds the determinations to the table. That is, the table preferably includes either signs indicative of normal condition and/or signs indicative of abnormal condition on the respective components which have been checked. Optionally, the signs indicative of a normal condition can be omitted. The indication of the abnormal signs are useful to warn the user of abnormal conditions. However, if such indications are not desired, the steps S25 and S26 can be omitted. After the step S26, the routine 124 moves to the step S27.

The inside computer 76, at the step S27, provides the outside computer 94 with the table. Optionally, the inside computer 76 can display the table on its monitor 80 so that the user can view the table at the cockpit 40 without bringing the outside computer 94 to the cockpit 44. The routine 124 then ends.

The outside computer 94 receives the response, i.e., the table, from the inside computer 76 at the step S12 and displays the table on its monitor 98. The routine 122 then ends.

Figure 5:
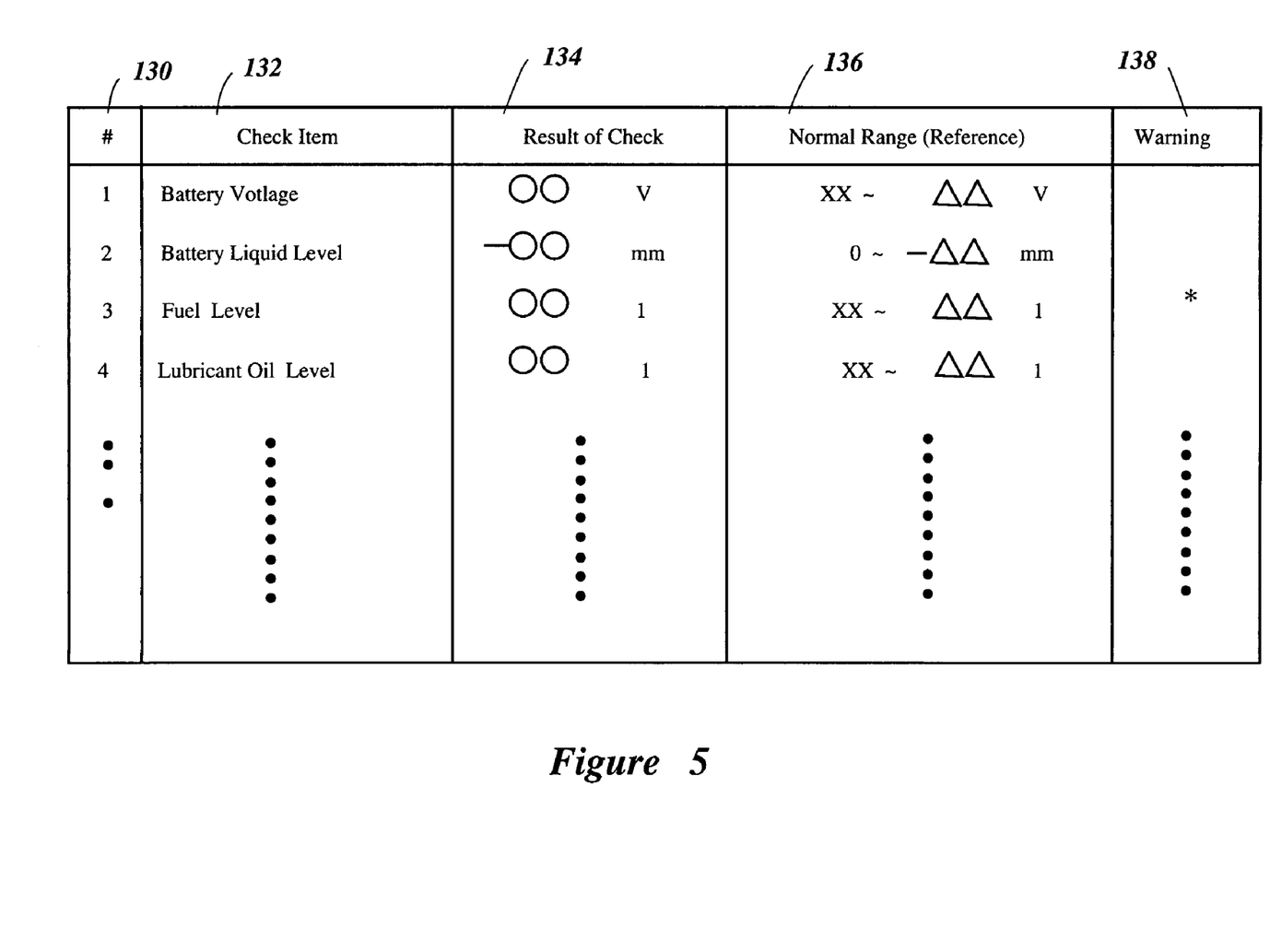
FIG. 5 is a table showing generic results of the routine illustrated in FIG. 4.

FIG. 5 illustrates an exemplary table. The illustrated table includes numberings 130, check items 132, the result of check 134, normal ranges 136 and abnormal warning signs 138. Some items can be omitted, while some other items can be added. A symbol or mark such as, for example, an asterisk "*" is an exemplary warning sign. The sign indicates an abnormal condition of the subject component. More specifically, the illustrated asterisk shows that a residual amount of the fuel in the fuel tank is less than a preset amount. In one alternative, the sign can blink. In another alternative, the number of the symbols can vary in accordance with the warning level. For example, but without limitation, the higher the warning level, the more the number of the symbols.

As thus described, a user such as an owner of the watercraft or a mechanic, can stay in the vehicle to conduct the diagnosis using the diagnostic system. Thus, the diagnosis conductor feels comfortable. In other words, the diagnostic system is quite efficient.

Before using the diagnostic system 30, the user turns on a switch for an electric power source that is placed in the watercraft 32 so as to supply electric power to the control device 54, the sensors 64, 66 and other components connected to the LAN 58 for the diagnosis. Thus, the user approaches the watercraft 32 at least once before starting the diagnosis.

Figure 6:
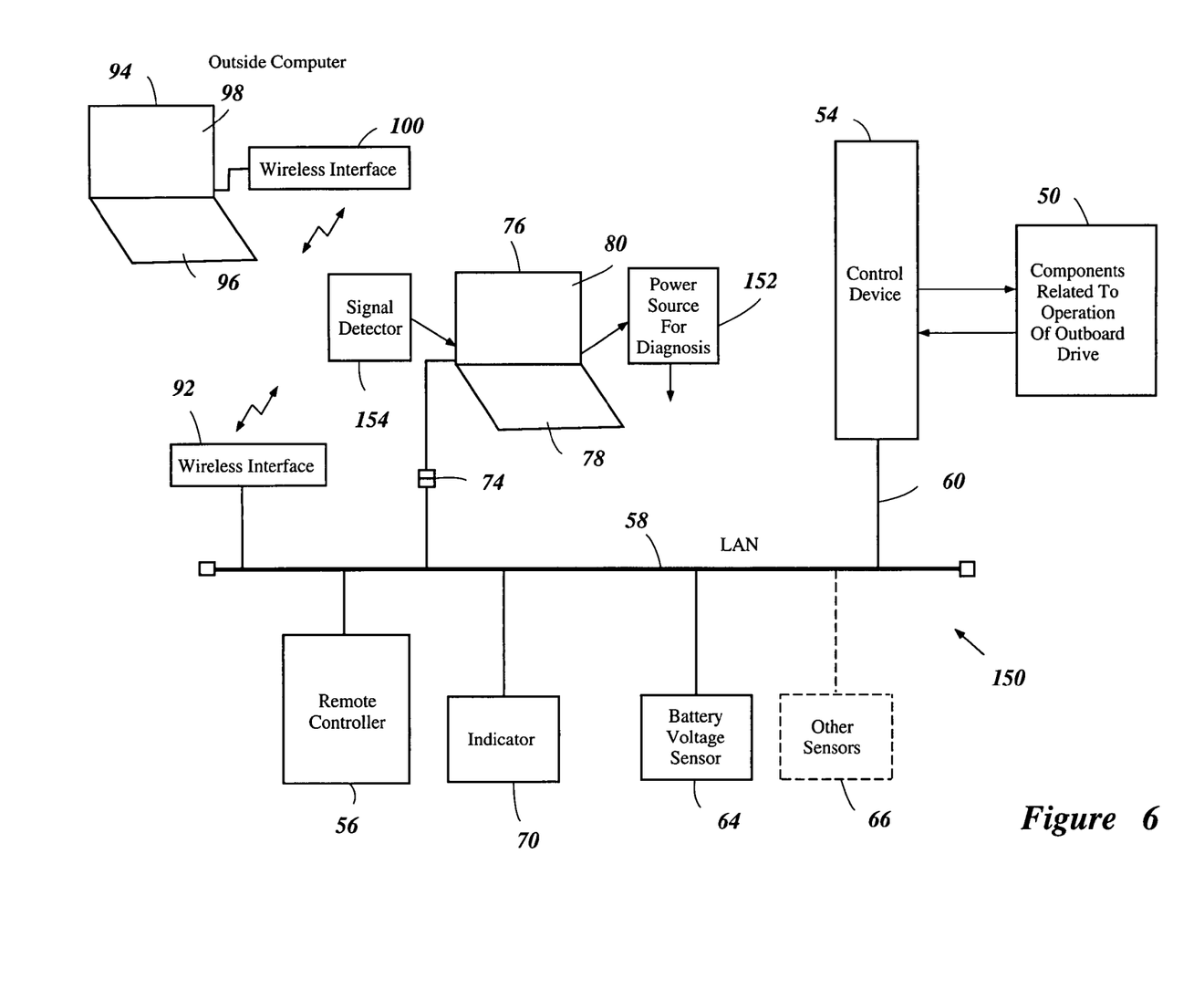
FIG. 6 is a block diagram of a modification of the diagnostic system illustrated in FIG. 2.

FIG. 6 illustrates a modification of the diagnostic system 30 described above with reference to FIGS. 1-5, and is identified generally by the reference numeral 150. In FIG. 6, the same devices, components and sensors that have been already described are assigned with the same reference numerals as those shown in FIG. 2.

The diagnostic system 150 incorporates an electric power source 152 that is particularly well-suited for the diagnosis. The inside computer 76 in the system 150 has a low-power start signal detector 154 that is supplied with electric power by a built-in power source of the inside computer 76. The start signal detector 54 preferably is formed to react on a specific signal that is the instruction signal provided by the outside computer 94 in this embodiment. For example, but without limitation, the start signal detector 54 can be constructed in accordance with devices commonly known as "Wake On Lan" (WOL) networking hardware, which is well known in the art.

Figure 7:
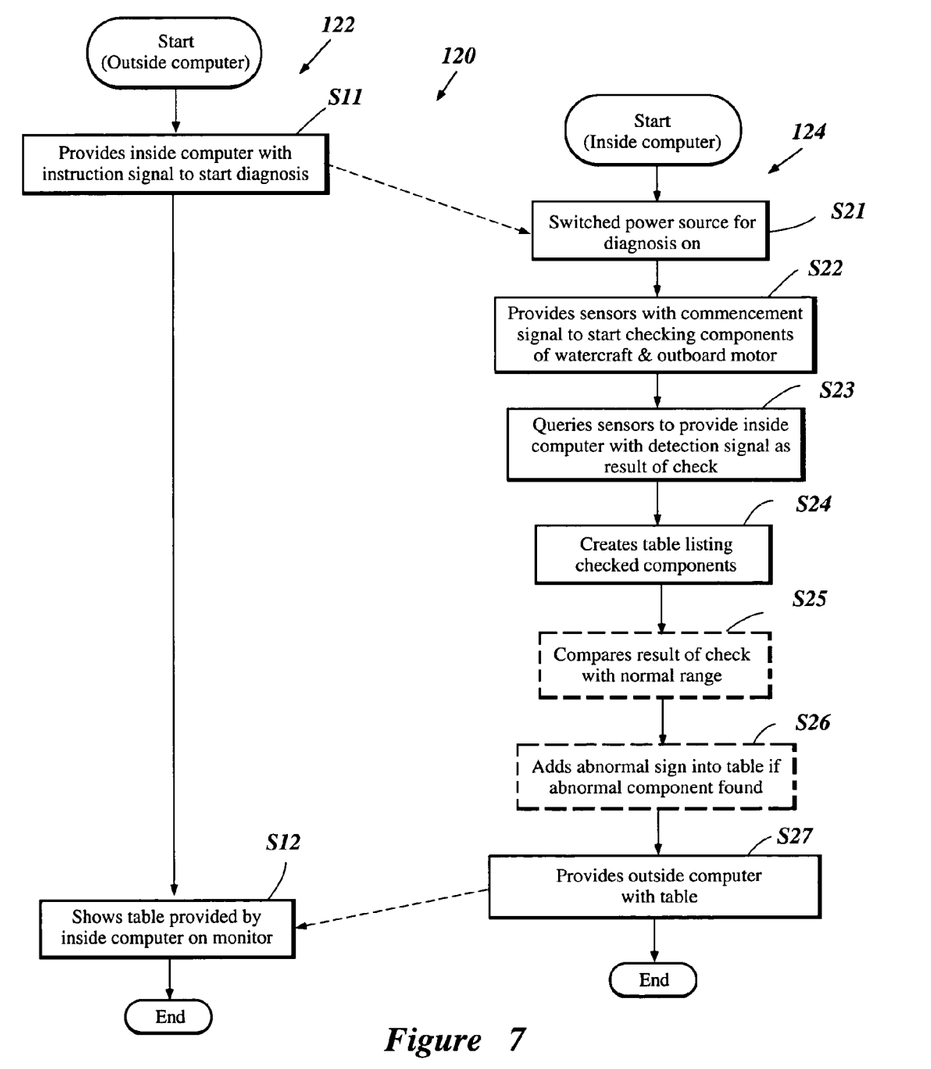
FIG. 7 is a flow chart of a control routine that can be used with the diagnostic system of FIG. 6.

FIG. 7 illustrates a flow chart of a routine that can be used with the modified diagnostic system 150. This routine can be performed by adding at least one step to the routine 124 of FIG. 4. The added step is the step S21. Other steps are the same as those of the program shown in FIG. 4, and thus descriptions for which are not repeated below.

At the step S21, the start signal detector 154 of the inside computer 76 detects the instruction signal provided by the outside computer 94. The inside computer 76 thus switches the power source 152 on. The routine 124 then proceeds to the following steps S22 through S27 and the inside computer 76 practices the diagnosis that has been described above. The outside computer 94 also practices the step S12 of the routine 122 upon receiving the signal from the inside computer 76 which is provided at the step S27. The term "end" after the step S27 in this modified embodiment means the end of the routine 124 and also the additional step of turning off of the power source 152.

Thereby, the user can perform a complete diagnostic procedure without climbing into the watercraft 32. Thus, the user can remain more comfortable and the modified diagnostic system is more efficient.

The power source 52 for the diagnosis can comprise an all-purpose power source for the watercraft which is originally equipped in the watercraft.

In the embodiments and alternatives described above, the inside and outside computers 76, 94 can be considered as sections of a relatively large scaled processor, which are separately disposed from each other. One processing section is located in the watercraft, while the other processing section is located out of the watercraft.

The inside computer 76 or the processing section located in the watercraft can be omitted. In this alternative, the entire program is installed in the outside computer 94. That is, the outside computer 94 has the routine 124 and the routine starts at the step S22. The step S11 of the routine 122 is not necessary. The step S27 of the routine 124 and the step S12 of the routine 122 are combined and the combined step is slightly changed. At the combined step, the outside computer 94 simply controls the monitor 98 to display the table.

The control routines 120 illustrated in FIGS. 4 and 7 are described above as software routines that can be stored on computer readable medium and run on general purpose computer, such as the computers 76 and 94. The routines 120 can also be referred to as "modules." In particular, the routines 120 illustrated in FIGS. 4 and 7 each can be referred to as a single module, a plurality of modules with each step of the routines 120 corresponding to one module, or combinations of modules in which at least one of the modules performs a plurality of the steps illustrated in FIGS. 4 and 7. Alternatively, the routines 120 illustrated in FIGS. 4 and 7 can be configured as one or plurality of modules to be run on a dedicated processor or memory. Further, the diagnostic systems 30, 150 can include one or plurality of devices including one or plurality of modules for performing the routines 120 illustrated in FIGS. 4 and/or 7. Each of the modules can be constructed with hard wired electronics, and configured to run all, a plurality, or only one step of the routines 120 illustrated in FIGS. 4 and/or 7.

Optionally, the outside computer 94 or the processing unit located out of the watercraft can be omitted rather than the inside computer 76 or the processing section located in the watercraft. In this alternative, the user conducts the diagnosis from the cockpit. That is, the user can centralize the diagnosis work at a seat in the cockpit and does not need to walk around. Thus, the diagnosis still has certain efficiency even in this alternative.

Optionally, a certain special purpose computer which is already equipped in the watercraft can be used as the inside computer 76. For example, a navigator unit, fish-finder or radio communications equipment can serve as the inside computer 76. The navigator unit can include a global positioning system (GPS) transponder. Either of the diagnostic routines 120 can be loaded into such a computer.

Also, certain special purpose computers which are already equipped in the vehicle or placed in the garage, the house or the office can be used as the outside computer 94. For example, a car navigation device or a home or office computer is applicable. The car navigation device can include a global positioning system (GPS) transponder. Either of the diagnostic routines 120 can be loaded into such a computer.

In the embodiments and alternatives described above, the outside computer 94 can be connected to the LAN by wire instead of a wireless connection. The computers and the LAN can communicate with one another using a protocol that is conventionally available.

Any conventional displays can be used as the monitors. For example, a liquid crystal display and a cathode ray tube (CRT) display are applicable.

The table listing diagnosed components is advantageous because the user can easily understand which component or components are abnormal or out of order. However, the table is not necessary. For instance, the diagnostic system can provide a diagnostic result of each component one by one.

Of course, the foregoing description is that of preferred diagnostic systems and methods having certain features, aspects and advantages in accordance with the present invention. Various changes and modifications also may be made to the above-described diagnostic systems and methods without departing from the spirit and scope of the invention, as defined by the claims.

What is claimed is:

1. A diagnostic system for a watercraft propelled by a propulsion unit and having a plurality of sensors configured to detect conditions of components related to at least the operation of the propulsion unit, the diagnostic system comprising first and second processors and an output device, the first processor comprising a first module configured to provide the second processor with an instruction signal to start a diagnosis of the components, the second processor comprising a second module configured to provide the sensors with a commencement signal to start checking the components, a third module configured to query the sensors for detection signals, a fourth module configured to collect the detection signals, and a fifth module configured to provide the first processor with a result of the check based upon the detection signals, the first processor additionally comprising a sixth module configured to control the output device to output the conditions of the components based upon the result of the check, the second processor comprising a seventh module configured to create a table listing the conditions of the components based upon the detection signals, and an eighth module configured to provide the first processor with the table as the result of the diagnosis.

2. The diagnostic system as set forth in claim 1, wherein the first, second and third modules are steps of a computer program.

3. The diagnostic system as set forth in claim 1, wherein the output device includes a monitor.

4. The diagnostic system as set forth in claim 1, wherein the first processor and the output device are located out of the watercraft.

5. The diagnostic system as set forth in claim 1, wherein the seventh module is configured to determine whether at least one of the detected conditions of the components is abnormal, and the result of the checking includes the determination conducted by the seventh module.

6. The diagnostic system as set forth in claim 1, wherein the first and sixth modules comprise steps of a computer program running on the first processor, and the second, third, fourth and fifth modules comprise steps of a computer program running on the second processor.

7. The diagnostic system as set forth in claim 1, wherein the first and second processors communicate with each other by radio.

8. The diagnostic system as set forth in claim 1, wherein the second processor additionally comprises a module configured to provide electric power to the sensors upon receiving the instruction signal provided by the first processor.

9. The diagnostic system as set forth in claim 1, wherein the watercraft is mounted on a trailer, the first processor is located either in a vehicle pulling the trailer or on the trailer.

10. The diagnostic system as set forth in claim 1, wherein the sensors are configured to detect conditions of components related to at least the operation of the propulsion unit and of the watercraft.

11. The diagnostic system as set forth in claim 1, wherein the sensors are disposed on both the propulsion unit and the watercraft.

12. A diagnostic system for a watercraft propelled by a propulsion unit and having a plurality of sensors configured to detect conditions of components related to at least the operation of the propulsion unit, the diagnostic system comprising first and second processors and an output device, the first processor comprising a first module configured to provide the second processor with an instruction signal to start a diagnosis of the components, the second processor comprising a second module configured to provide the sensors with a commencement signal to start checking the components, a third module configured to query the sensors for detection signals, a fourth module configured to collect the detection signals, and a fifth module configured to provide the first processor with a result of the check based upon the detection signals, the first processor additionally comprising a sixth module configured to control the output device to output the conditions of the components based upon the result of the check, the second processor additionally comprising a seventh module configured to create a table listing the conditions of the components based upon the detection signals, an eighth module configured to provide the first processor with the table as the result of the diagnosis, a ninth module configured to determine whether at least one of the detected conditions of the components is abnormal, and a tenth module configured to add the determination to the table.

13. A diagnostic system for a watercraft propelled by a propulsion unit, the watercraft and the propulsion unit having a plurality of sensors configured to detect conditions of components related to the operation of the propulsion unit and of the watercraft, the components being electrically connected via a local area network (LAN), the LAN being connected to a computer via a connector disposed separate from the computer, the LAN also connecting a control device configured to control the operation of the propulsion unit to a remote controller, the diagnostic system comprising first and second processors and an output device, the first processor comprising a first module configured to provide the second processor with an instruction signal to start a diagnosis of the components, the second processor comprising a second module configured to provide the sensors with a commencement signal to start checking the components, a third module configured to query the sensors for detection signals, a fourth module configured to collect the detection signals, and a fifth module configured to provide the first processor with a result of the check based upon the detection signals, the first processor additionally comprising a sixth module configured to control the output device to output the conditions of the components based upon the result of the check, wherein the second processor additionally comprises a seventh module configured to create a table listing the conditions of the components based upon the detection signals, and an eighth module configured to provide the first processor with the table as the result of the diagnosis.

14. A diagnostic system for a watercraft propelled by a propulsion unit, the watercraft and the propulsion unit having a plurality of sensors configured to detect conditions of components related to the operation of the propulsion unit and of the watercraft, the components being electrically connected via a local area network (LAN), the LAN being connected to a computer via a connector disposed separate from the computer, the LAN also connecting a control device configured to control the operation of the propulsion unit to a remote controller, the diagnostic system comprising first and second processors and an output device, the first processor comprising a first module configured to provide the second processor with an instruction signal to start a diagnosis of the components, the second processor comprising a second module configured to provide the sensors with a commencement signal to start checking the components, a third module configured to query the sensors for detection signals, a fourth module configured to collect the detection signals, and a fifth module configured to provide the first processor with a result of the check based upon the detection signals, the first processor additionally comprising a sixth module configured to control the output device to output the conditions of the components based upon the result of the check, wherein the second processor additionally comprises a seventh module configured to create a table listing the conditions of the components based upon the detection signals, and an eighth module configured to provide the first processor with the table as the result of the diagnosis, and wherein the second processor further comprises a ninth module configured to determine whether at least one of the detected conditions of the components is abnormal, and a tenth module configured to add the determination to the table.

* * * * *

UNITED STATES PATENT AND TRADEMARK OFFICE
CERTIFICATE OF CORRECTION

PATENT NO. : 7,353,095 B2
APPLICATION NO. : 10/255042
DATED : April 1, 2008
INVENTOR(S) : Isao Kanno and Hitoshi Motose It is certified that error appears in the above-identified patent and that said Letters Patent is hereby corrected as shown below:

At Drawing Sheet 5 of 8, line 2, please delete "Votlage" and insert -- Voltage --, therefor.

At column 5, line 44, after "6,890,223" insert -- , --.

At column 7, line 40, after "abandoned" insert -- , --.

Signed and Sealed this

Eleventh Day of November, 2008

JON W. DUDAS
*Director of the United States Patent and Trademark Office*